(12) United States Patent
Xu (10) Patent No.: US 7,961,362 B2
(45) Date of Patent: *Jun. 14, 2011

(54) METHOD AND APPARATUS FOR PHASE CORRECTION IN A SCANNED BEAM IMAGER

(75) Inventor: Jianhua Xu, Mill Creek, WA (US)

(73) Assignee: Microvision, Inc., Redmond, WA (US)

( * ) Notice: Subject to any disclaimer, the term of this patent is extended or adjusted under 35 U.S.C. 154(b) by 845 days.

This patent is subject to a terminal disclaimer.

(21) Appl. No.: 12/004,474

(22) Filed: Dec. 19, 2007

(65) Prior Publication Data

US 2009/0161181 A1   Jun. 25, 2009

(51) Int. Cl.
*H04N 1/04* (2006.01)
(52) U.S. Cl. ......... 358/474; 358/447; 358/471; 358/296
(58) Field of Classification Search .................. 358/474, 358/447, 471, 296; 250/208.1
See application file for complete search history.

(56) References Cited

U.S. PATENT DOCUMENTS

| | | | | |
|---|---|---|---|---|
| 5,121,138 A | * | 6/1992 | Schermer et al. | 347/250 |
| 6,084,627 A | * | 7/2000 | Cook et al. | 347/248 |
| 6,337,162 B1 | * | 1/2002 | Irie | 430/5 |
| 2001/0006544 A1 | * | 7/2001 | Kawasaki et al. | 375/376 |
| 2003/0178554 A1 | * | 9/2003 | Zak | 250/221 |
| 2005/0040513 A1 | * | 2/2005 | Salmon | 257/698 |

* cited by examiner

*Primary Examiner* — Houshang Safaipour
(74) *Attorney, Agent, or Firm* — Kevin D. Wills

(57) ABSTRACT

A method for detecting scanner phase error in a bidirectional scanned beam imager includes obtaining first and second images derived from respective first and second scan directions, comparing apparent image feature positions in the first and second images, and calculating a phase error corresponding to a difference between the apparent image feature positions. The comparison may include multiplying frequency domain transformations of the images.

26 Claims, 10 Drawing Sheets

FIG. 7B
IMAGE_H_1
$V_H$ NEGATIVE
$V_V$ POSITIVE

FIG. 7A
IMAGE_H_0, IMAGE_V_0
$V_H$ POSITIVE
$V_V$ POSITIVE

FIG. 7C
IMAGE_V_1
$V_H$ POSITIVE
$V_V$ NEGATIVE

METHOD AND APPARATUS FOR PHASE CORRECTION IN A SCANNED BEAM IMAGER

BACKGROUND

In a scanned beam image capture apparatus such as a bar code scanner, laser camera, scanned beam endoscope, etc. it may be generally necessary to synchronize the phase of a beam scanner to the image processor so that pixels are assigned their correct positions in an output image. Previously, scanned beam imager systems have typically made use of position or phase sensors coupled to the scanner, or optical sensors configured to receive a swept beam of light at a known position. Synchronization was then made by comparing the timing of an actual signal from such sensors to nominal signal timing. Differences attributable to phase error between actual and nominal timings were then used to modify the scanner drive signal to minimize the phase error.

It may be desirable to eliminate or reduce the reliance on at least some dedicated sensors formerly used to detect a parameter corresponding to scanner phase. Furthermore, it may be desirable to find an improved method and apparatus for detecting and correcting phase error.

OVERVIEW

According to an embodiment, an improved method and apparatus may be used to detect phase errors in a scanned beam image capture apparatus.

According to another embodiment, a scanned beam image capture apparatus may provide improved phase stability of the beam scanner.

According to another embodiment, a scanned beam image capture apparatus may measure scanner phase substantially without the use of a dedicated scanner position or beam position sensor.

According to another embodiment, a scanned beam image capture apparatus may detect scanner phase from the characteristics of the captured image. The detected phase may be used to drive the scanner to a desired phase, or alternatively may be used to adjust the parameters of an image processor to follow phase variations of the scanner.

According to another embodiment, a image-based phase detection algorithm may provide faster processing and/or reduced processing requirements by conducting processing at least partly in the frequency domain, such as by performing a fast Fourier transform (FFT) on reduced information set images having differing phase responses, performing a matrix multiplication between the frequency domain transform one reduced information set image and the conjugate of the frequency domain transform of the other reduced information set image, and performing an inverse transform (FFT$^{-1}$) to provide a cross correlation, which may be displayed as an image exhibiting a phase effect.

DETAILED DESCRIPTION

The phrase "subject matter described herein" refers to subject matter described in the Detailed Description unless the context clearly indicates otherwise. The term "includes" should be read as "includes, but is not limited to" unless the context clearly indicates otherwise. The term "or" is an inclusive "or" operator, and is equivalent to the term "and/or," unless the context clearly dictates otherwise. The term "an embodiment" should be read as "at least one embodiment." The term "another embodiment" should be read as "at least one other embodiment." The term "aspects" when used by itself is short for "aspects of the subject matter described herein." The phrase "aspects of the subject matter described herein" should be read as "at least one feature of at least one embodiment." Identifying aspects of the subject matter described in the Detailed Description is not intended to identify key or essential features of the claimed subject matter.

Flow diagrams are depicted in some figures below. In an embodiment, actions associated with the flow diagrams occur in an order corresponding to the flow diagrams. In other embodiments, actions are constrained only by the order in which results are required and may occur in other orders or in parallel, depending upon implementation. It will be recognized by those skilled in the art that alternative actions may be substituted for actions described herein to achieve the same function or that some actions may be omitted or changed to provide the same functionality without departing from the spirit or scope of the subject matter described herein.

Figure 1:
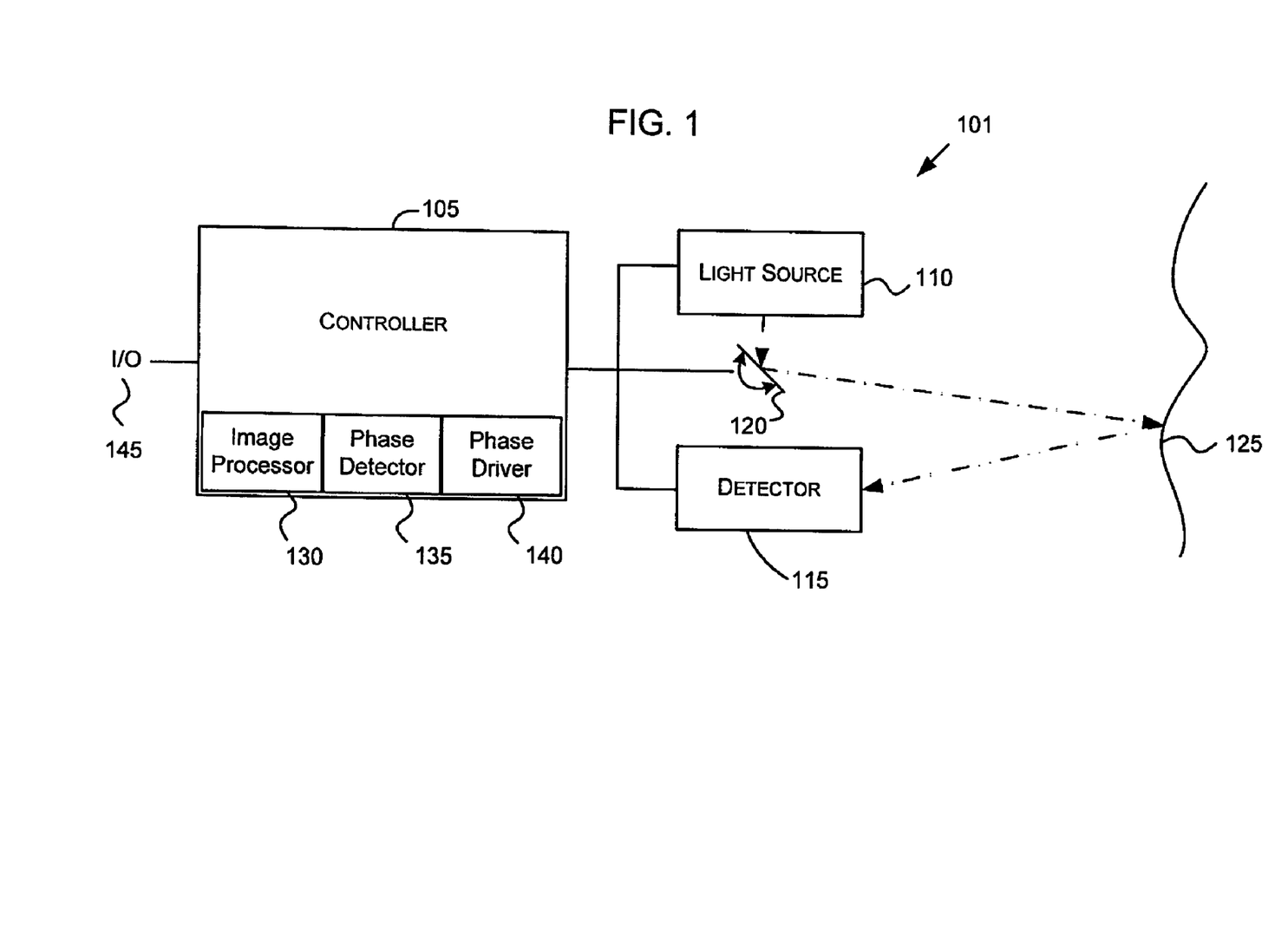
FIG. 1 is diagram of a scanned beam image capture apparatus, according to an embodiment.

FIG. 1 is a diagram that represents a scanned-beam system 101 according to an embodiment. The system 101 includes a controller 105 coupled to one or more light sources 110, one or more light detectors 115, and one or more beam scanners 120. In an embodiment, the controller 105 may vary the intensity of the light source 110 as well as the sensitivity of the detector 115. In addition, the controller 105 may control the scanner 120 to cause the light generated from the light source 110 to be scanned across a field of view 125 in a two-dimensional scan pattern. In some embodiments, the scanner 120 may oscillate at a known or selectable frequency. The scanned light may sequentially impinge on spots across substantially the entire 2D field of view 125 during a frame, and then repeat the process during each subsequent frame. A portion of the scanned light that scatters from the field of view 125 may impinge upon and be detected by the detector 115. The detector 115 may generate an electrical signal corresponding to the light scattered by the sequence of scanned spots in the field of view 125. The controller 105 may receive the signal and convert the signal into an image frame corresponding to an image of the field of view 125.

Images may be detected at a specified or selected frame rate. For example, in an embodiment, an image is detected and converted into a frame 30 times per second.

In accordance with the subject matter described herein, in some embodiments, light comprises visible light. In other embodiments light comprises non-visible radiation detectable by the detector 115 and may include a combination of infrared, ultraviolet, radio, gamma waves, x-rays, and radiation of other frequencies in the electromagnetic spectrum. According to some embodiments the light source 110 may be configured to emit plural wavelengths of light, such as red, green, and blue (RGB), and the detector 115 may be configured to detect the plural wavelengths of light. The reduced information set (RIS) images described below may be constructed from pixels corresponding to one or more of the wavelengths of light emitted by the light source 110, and may be derived from wavelengths of light other than the wavelengths used to form a complete image.

The controller 105 may comprise one or more application-specific integrated circuits (ASICs), discrete components, embedded controllers, general or special purpose processors, any combination of the above, and the like. In some embodiments, the functions of the controller 105 may be performed by various components. For example, the controller may include hardware components that interface with the light source 110 and the detector 115, hardware components (e.g., such as a processor or ASIC) that perform calculations based on the received detection signal, and software components (e.g., software, firmware, circuit structures, and the like) which a processor or the like executes to perform calculations. These components may be included on a single device or distributed across more than one device without departing from the spirit or scope of the subject matter described herein.

The software components may be stored on any available machine-readable media accessible by the controller 105 and may include both volatile and nonvolatile media and removable and non-removable media. By way of example, and not limitation, machine-readable media may comprise storage media and communication media. Storage media includes both volatile and nonvolatile, removable and non-removable media implemented in any method or technology for storage of information such as machine-readable instructions, data structures, program modules, or other data. Storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the controller 105. Communication media typically embodies machine-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of machine-readable media.

In an embodiment, at least part of the scanned-beam system is part of a camera, video recorder, document scanner, other image capturing device, or the like. In an embodiment, the scanned-beam system may comprise a microelectromechanical (MEMS) scanner that operates in a progressive or bi-sinusoidal scan pattern. In other embodiments, the scanned-beam system may comprise a scanner having electrical, mechanical, optical, fluid, other components, any combination thereof, or the like that is capable of directing light in a pattern.

According to an embodiment, the controller 105 includes an image processor 130. The image processor 130 may be operable to receive the detection signal from the detector 115, or a data signal corresponding to the detection signal, and construct one or more images therefrom. The one or more images may be transmitted externally, such as to an external computer or network via an interface 145.

The image processor 130 is operable to construct one or more pairs reduced information set (RIS) images for use by a phase detector 135. The phase detector 135 is operable to receive pairs of RIS images from the image processor 130 and perform processing on the pairs of RIS images to determine a phase error between the image processor 130 and the beam scanner 120. In particular, according to an embodiment, the phase detector 135 is configured to determine the difference in phase between a first image consisting of pixels generated from left-to-right scanned sequences of spots and a second image consisting of pixels generated from right-to-left scanned sequences of spots. According to another embodiment, the phase detector 135 is configured to determine the difference in phase between a first image consisting of pixels generated from top-to-bottom scanned sequences of spots and a second image consisting of pixels generated from bottom-to-top scanned sequences of spots.

According to embodiments, the controller includes a phase driver 140 configured to receive data corresponding to the phase difference(s) detected by the phase detector, and drive a parameter to minimize the detected phase difference(s). For example, the phase driver 140 may include a scanner driver to modify the phase of the scanner 120 to conform to a desired phase. Alternatively or additionally, the phase driver 140 may drive the image processor 130 to conform to the actual phase of the scanner 120. The phase driver 140 may operate substantially continuously to drive the system to phase synchronization. The phase driver may also be configured to converge the phase synchronization over a series of frames, such as by using a relatively low control gain. Multi-frame phase convergence may be performed, for example, by advancing or retarding the scanner or image processor phase gradually over a series of frames to "bridge" relatively large deviations in relative phase. Multi-frame convergence may be especially useful for compensating for shock-type variations in detected phase, such as may result from a physical shock, an electrical transient, etc.

While the image processor 130, phase detector 135, and phase driver 140 are indicated as being embedded in the controller 105, other embodiments may include one or more of the image processor 130, phase detector 135, and phase driver 140 being physically separated from the controller 105. In some embodiments, one or more of 130, 135, and 140 may be physically located on a separate integrated or discrete circuit from that associated with the controller 105. In other embodiments, one or more of 130, 135, and 140 may be physically located in a remote apparatus, such as in a computer or other processing device addressed via the interface 145.

Figure 2:
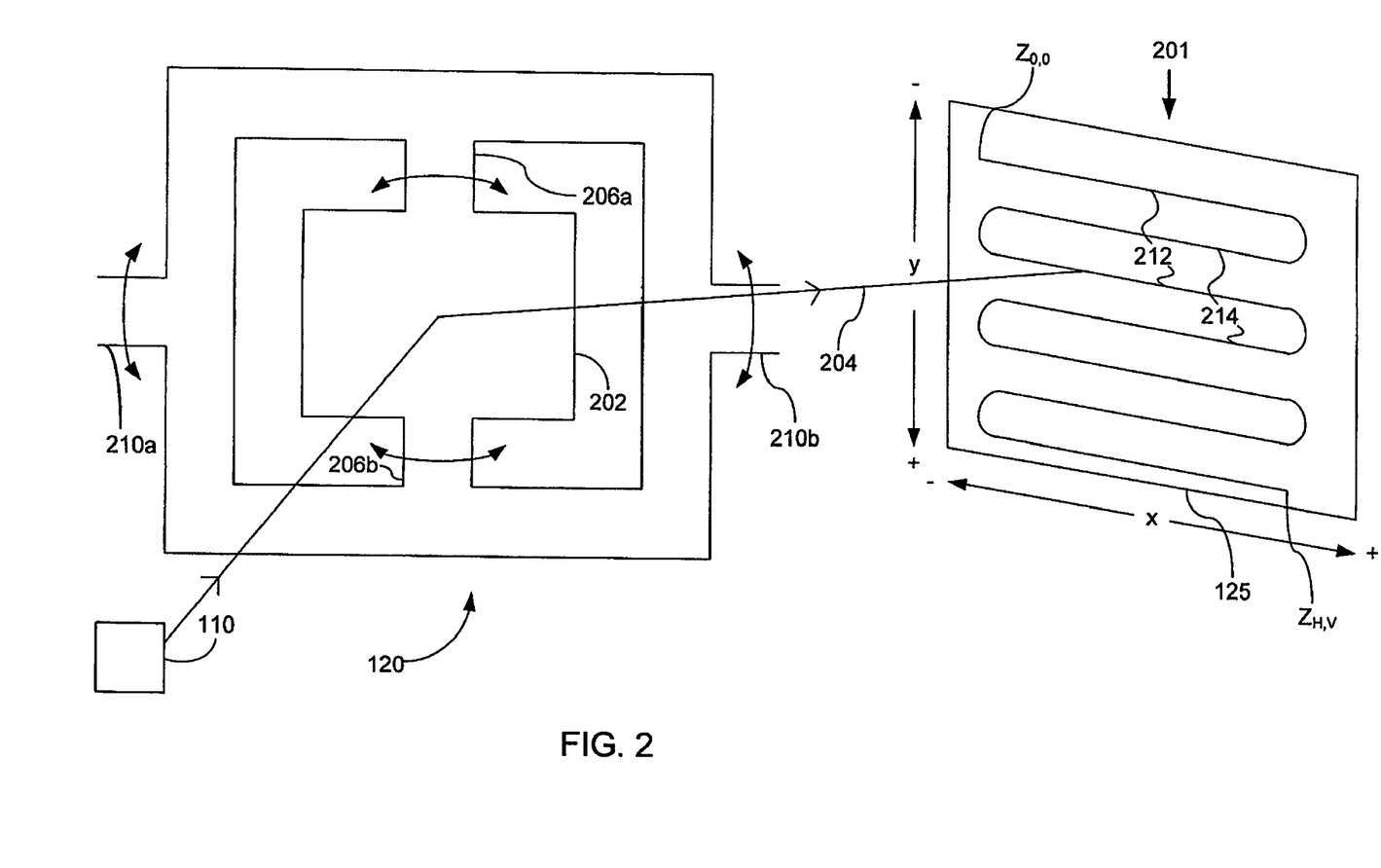
FIG. 2 is a diagram of a type bidirectional beam scan pattern that may be produced by the image capture apparatus of FIG. 1, according to an embodiment.

As indicated above, a scanned beam image may be bidirectional in one or both axes. FIG. 2 illustrates an idealized scan pattern 201 that is bi-directional in the horizontal axis and a ramp drive in the vertical axis, according to an embodiment.

Referring to FIG. 2, the scanner 120 starts scanning a field of view 125 at an initial pixel location X=0, Y=0 (Z₀,₀) and stops scanning the image at an end pixel location X=H, Y=V, ($Z_{H,V}$) where H is the number of pixels in the horizontal (X) dimension of the image and V is the number of pixels in the vertical (Y) dimension of the image. The light source 110 launches a beam of light onto a scanning mirror 202 the scanner 120. The scanner sinusoidally sweeps the beam 204 bi-directionally in the horizontal (X) dimension at a horizontal sweep frequency $f_h=1/t_h$, where $t_h$ is the period of the horizontal sinusoid. The scanner 120 oscillates in a sinusoidal manner about the pivot arms 206a and 206b at $f_h$, and thus sinusoidally sweeps the beam 2048 from side to side of the field of view 125 at the same frequency. The horizontal sweep is bidirectional because the beam 204 is "on", and thus illuminates spots in the field of view, in both the left-to-right (+X) and right-to-left (−X) horizontal directions. Although not required, $f_h$ may substantially equal the resonant frequency of the scanner 120 about the arms 206a and 206b. One advantage of designing the scanner 120 such that it resonates at $f_h$ is that the scanner 120 may be driven in the horizontal (X) dimension with relatively little power.

The vertical dimension (Y) may be driven with a ramp waveform to provide a progression of beam position from lower (−) to greater (+) vertical positions down the field of view 125 as gimbal ring 210 of the scanner 120 is driven rotationally around the slow scan torsion arms 210a, 210b. A video frame may be generated during each top-to-bottom vertical sweep of the beam. After the horizontal scanner sweeps across the bottom row of spots in the field of view, the light source 110 may be momentarily shut off (although this momentary blanking may not be necessary for every embodiment), and the vertical scanner performs a "flyback" to the top of the frame. The light source may then be turned on again and the vertical scanner again begins its sweep downward across the field of view. When the horizontal scanning is performed in resonance, the horizontal typically continues to sweep back and forth during the flyback of the vertical scan. The image processor 130 typically ignores any signal from the detector 115 occurring during the vertical flyback.

The electrical signal and/or data corresponding to the electrical signal that drives the scanner back and forth across the horizontal axis may be referred to as the horizontal drive signal. Similarly, the electrical signal and/or data corresponding to the electrical signal that drives the scanner downward across the vertical axis may be referred to as the vertical drive signal.

Figure 3:
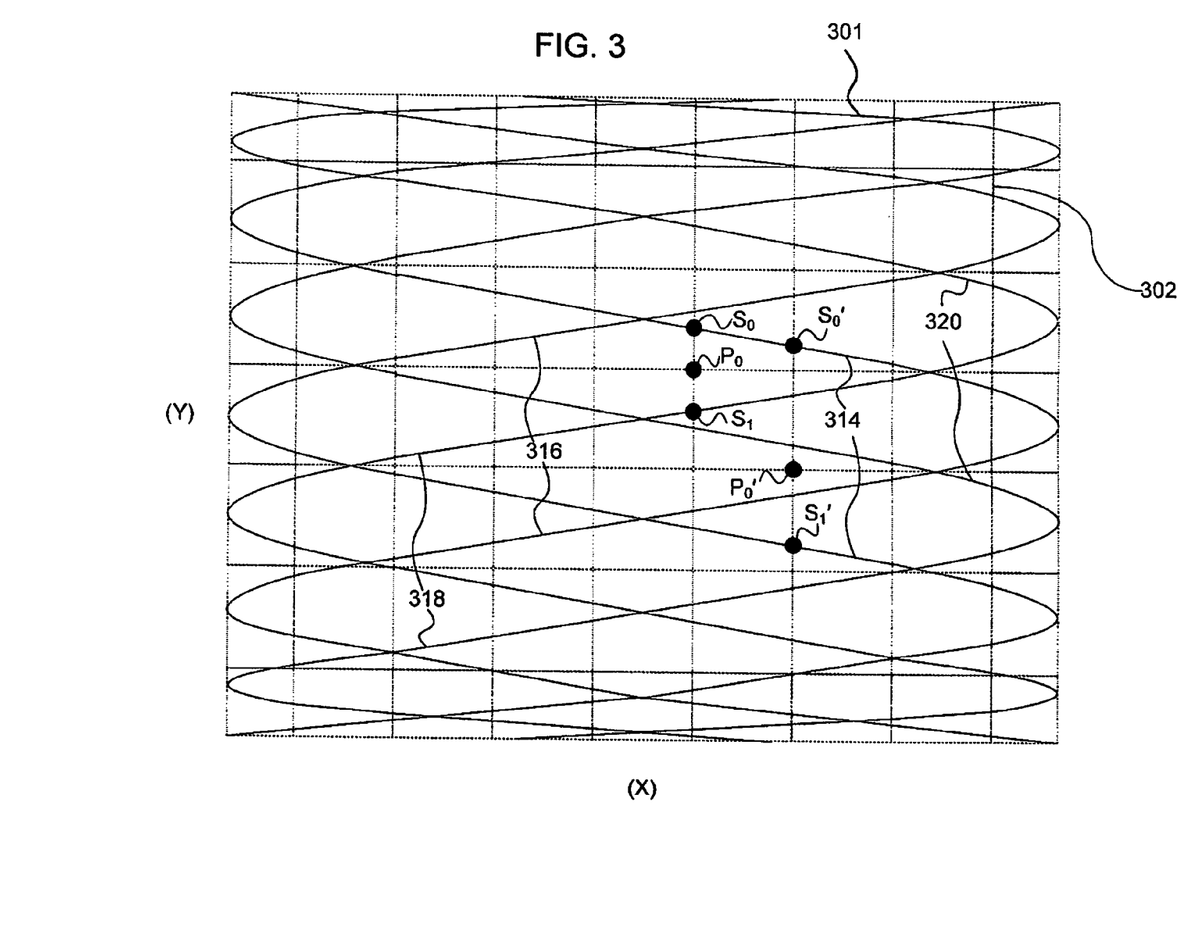
FIG. 3 is a diagram of another bidirectional beam scan pattern that may be produced by the image capture apparatus of FIG. 1, according to an embodiment.

According to another embodiment, the scan pattern may be bidirectional in both the horizontal and vertical positions, such as in the Lissajous scan pattern 301 of FIG. 3. The scanner may sweep the beam sinusoidally and bi-directionally in both the horizontal (X) and vertical (Y) dimensions, although one can use a sweeping function other than a sinusoid in either of the horizontal and vertical dimensions. The term "bi-sinusoidal may be used to denote a sinusoidal and bidirectional sweep of the image beam in both the horizontal (X) and vertical (Y) dimensions. Because both of the horizontal and vertical sweep functions are sinusoids, the resulting two-dimensional scan pattern is a repeated pattern such as a Lissajous pattern. For simplicity of presentation, the term Lissajous pattern will be used herein to refer to patterns that employ sinusoidal motion in about two or more axes.

FIG. 3 is a plot of an example of one bi-sinusoidal scanning pattern 301 (solid line) overlaid on an output image grid pattern 302 (dashed line) according to an embodiment. The bi-sinusoidal scanning pattern 301 represents the path of the scanned beam as it sweeps horizontally and vertically to scan the field of view, and thus represents all possible locations of collected spots that may be decoded to create an output image. Conversely, the intersecting points of the grid pattern 302 identify the locations of the pixels P that compose the output image.

In some embodiments, the Lissajous scan pattern 301 may be dense enough for scattered light from spots actually traversed by the beam to serve as approximations for the amount of light that would have been scattered from spots located at intersections of the rectilinear grid 302. In other embodiments, it may be desirable to use a less dense Lissajous pattern and/or provide a closer approximation to the light that would have been scattered from the rectilinear array of spots. Interpolation may be used to estimate the values of non-traversed members of the rectilinear array of spots. For example values of the detector signal corresponding to traversed spots $S_0$ and $S_1$ may be used by the image processor 130 to estimate the value of output pixel $P_0$. From inspection of the simplified scan pattern 301 and rectilinear grid 302 of FIG. 3, it may be seen that a simple mathematical average of $S_0$ and $S_1$ may yield an acceptable estimate for use as $P_0$. In other cases, other estimates such as weighted averages of two spots S, weighted averages of four spots S, or more complex formulas may be used to interpolate a value for $P_0$.

Figure 4:
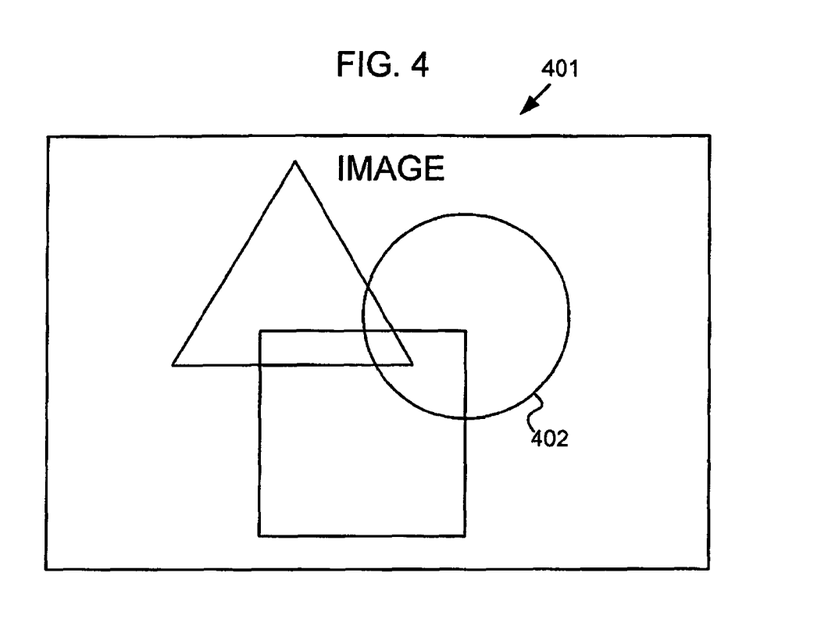
FIG. 4 is an idealized in-phase image that may be produced by the scanned beam image capture device of FIG. 1, according to an embodiment.

If the phase relationship between the scanner motion and the image processor is synchronized, an image such as image 401 shown in FIG. 4 may be produced. Features 402 of the image 401 may be seen to be crisp and clear.

Figure 5:
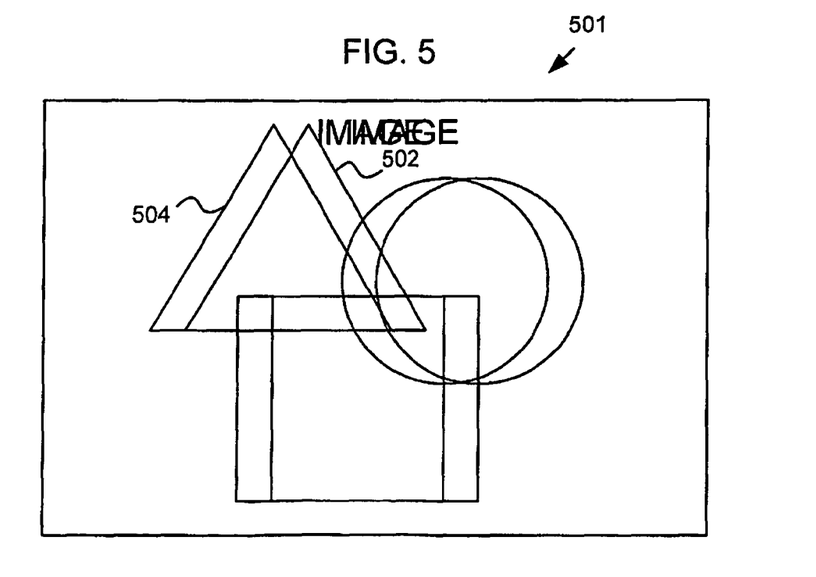
FIG. 5 is an idealized out-of-phase image that may be produced by the scanned beam image capture device of FIG. 1, according to an embodiment.

On the other hand, if the relationship between the scanner phase and the image processor phase is not synchronized, an undesirable image such as image 501 of FIG. 5 may be produced. As may be seen, the image 501 includes two portions 502 and 504 offset from one another. Each of the two image portions 502, 504 are produced by a beam swept in a particular direction. For example, image portion 502 may be produced by a right-sweeping beam that is phase-delayed (retarded) relative to the imager, and image portion 504 may be produce by a left-sweeping beam that is similarly phase-delayed relative to the imager. With the right-sweeping beam, for example, image portion 502 may be actually detected at a position corresponding to the more central position of image 402, but because the scanner is not as far to the right in its sweep as the image processor assumes (i.e., the scanner is phase-delayed), the image processor assigns the detected pixel values to positions 502 that are farther to the right than where they were actually detected. With the left-sweeping beam, the features of the image are actually detected at substantially coincident left-right locations as the corresponding right-sweeping beam, but because the scanner is phase delayed, the image processor assigns the detected features to be farther to the left than the actual location of the scanning beam.

For an equivalent magnitude but opposite sign of phase error (scanner phase advanced relative to image processor phase), substantially the same image 501 may be produced by a scanner that is phase-advanced relative to the image processor, except that the image portion 502 may be produced by a phase-advanced left-sweeping beam and the image portion 504 may be produced by a similarly phase-advanced right-sweeping beam. As may be seen, phase errors may have a deleterious effect on image quality.

The image processor 130, phase detector 135, and phase driver 140, shown in FIG. 1, may cooperate to detect and correct phase errors in the image.

Referring back to FIG. 2, the scan pattern 201 includes rightward sweeping sequences or sweeps 212 of illuminated spots (horizontal velocity, $V_H>0$) and leftward sweeping sequences of illuminated spots 214 (horizontal velocity, $V_H<0$). Because of the ramp drive waveform on the vertical axis, all sweeps are downward sweeping (vertical velocity, $V_V>0$) in the scan pattern 201. Referring back to FIG. 3, the scan pattern 301 similarly includes rightward sweeping sequences of illuminated spots 314, 318 (horizontal velocity, $V_H>0$) and leftward sweeping sequences of illuminated spots 320, 316 (horizontal velocity, $V_H>0$). The scan pattern 301 also includes downward sweeping sequences of illuminated spots 314, 316 (vertical velocity, $V_V>0$) and upward sweeping sequences of illuminated spots 318, 320 (vertical velocity, $V_V<0$). An output image from the controller 105 of FIG. 1 generally includes pixels derived from all sweeps (e.g. rightward, leftward, upward, and downward sweeps) of the beam.

However, with a phase error, the full output image would include position-offset components, for example corresponding to image portions 502 and 504 of FIG. 5. On the other hand, a RIS image including only pixel values derived from rightward-sweeping scans would include a single image, albeit offset to the right or left for respectively retarded or advanced phase relative to the image processor. Similarly, a RIS image including only pixel values derived from leftward-sweeping scans would include a single image offset in the opposite direction from the image derived from rightward-sweeping scans. By comparing the relative positions of the features 502 and 504 in the RIS images, one may determine how far the scanner needs to be advanced or retarded for the image processor to output an in-phase image corresponding to image 401 of FIG. 4. Alternatively, by comparing the relative positions of the features 502 and 504, one may determine how far the assumed scanner phase in image processor needs to be advanced or retarded to output a clean image 401. While either approach may work, the description herein, for the sake of simplicity of description, will focus on modification of the scanner drive signal to modify the scanner phase. It will be understood, however, that modification of the phase driver 140 signal may be used to modify the scanner drive, the image processor parameters, or other parameters that can assign detected pixel values to their proper locations.

Figure 6:
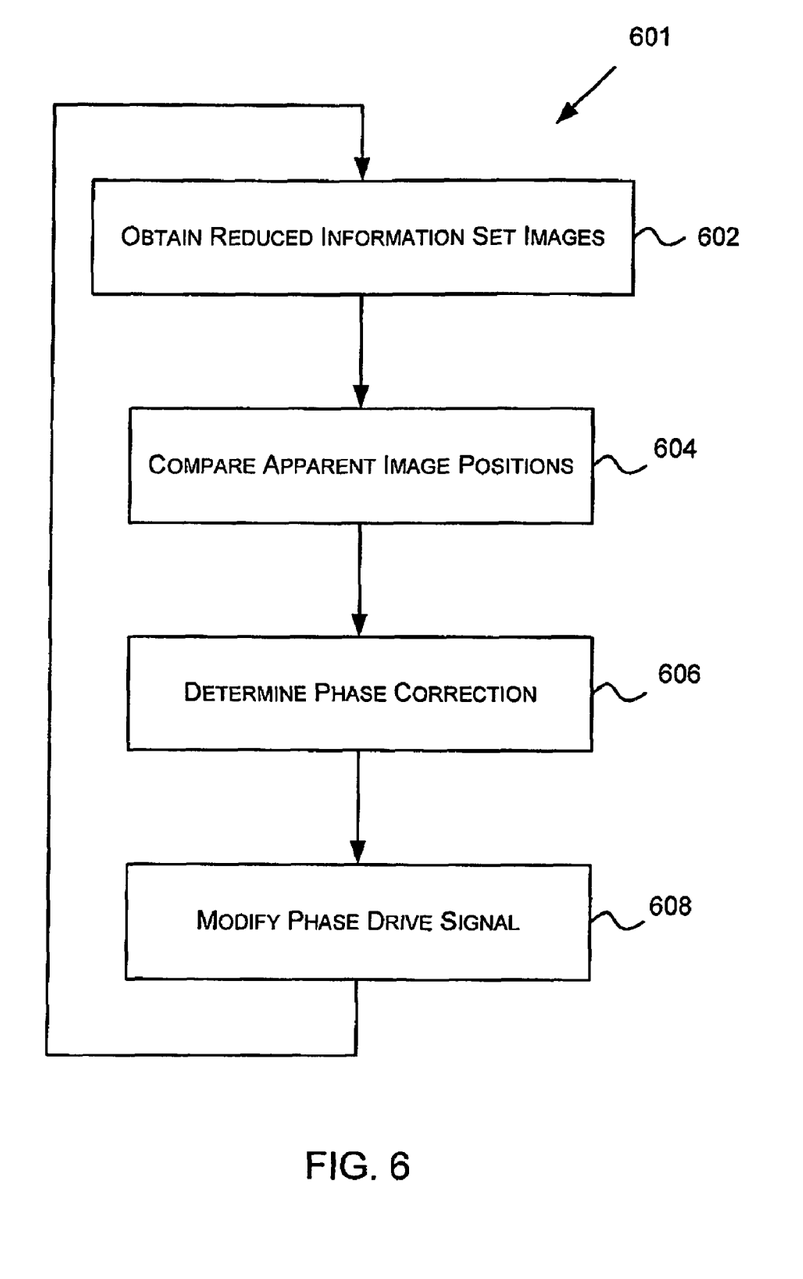
FIG. 6 a process for determining the phase of a scanned beam from an image, according to an embodiment.

FIG. 6 illustrates a process 601 for detecting phase errors in an image and modifying a phase drive signal to compensate for the phase errors, according to an embodiment. Beginning at step 602, the phase detector 135 receives RIS images from the image processor 130.

Figure 7A:
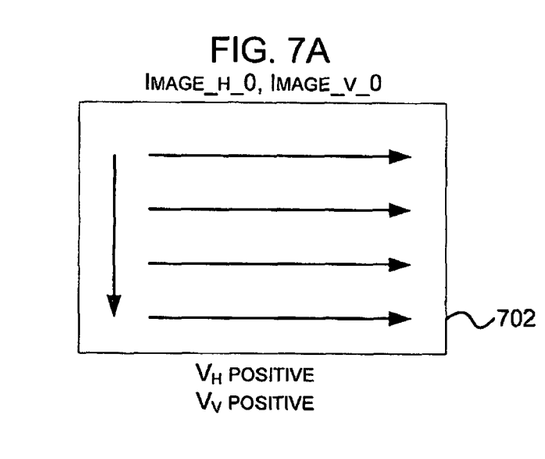
FIG. 7A is a simplified depiction of a reduced information set image that may be used in a process to determine scanner phase, according to an embodiment.
Figure 7B:
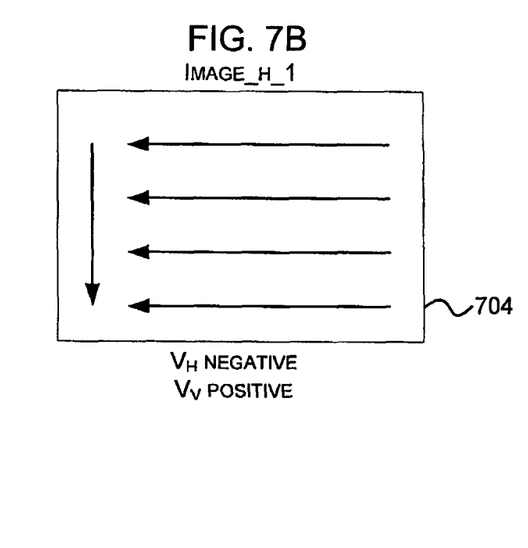
FIG. 7B is a simplified depiction of another reduced information set image that may be used in a process to determine scanner horizontal phase, according to an embodiment.
Figure 7C:
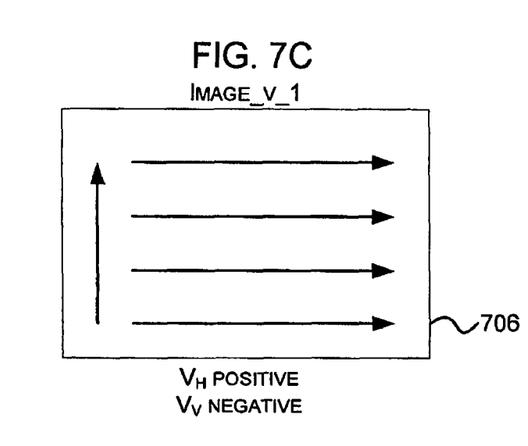
FIG. 7C is a simplified depiction of another reduced information set image that may be used in a process to determine scanner vertical phase, according to an embodiment.

FIG. 7A illustrates a reduced information set (RIS) image 702 that is constructed from beam sweeps moving from left-to-right and top-to-bottom. That is, the RIS image 702 (referred to below as matrix image_h_0) is constructed with pixels calculated from spots in the field of view traversed by the scanned beam while horizontal scan velocity $H_V$ and the vertical scan velocity $V_V$ are both positive. For example, pixels in the RIS image 702 may be constructed from beam sweeps 212 of the scan pattern 201 shown in FIG. 2. In another example, pixels in the RIS image 702 may be constructed from beam sweeps 314 of the scan pattern 301 shown in FIG. 3. FIG. 7B illustrates a RIS image 704 (referred to below as matrix image_h_1) that is constructed from beam sweeps moving from right-to-left and top-to-bottom. That is, the RIS image 704 is constructed with pixels derived from spots in the field of view traversed by the scanned beam while horizontal scan velocity $V_H$ is negative and the vertical scan velocity $V_V$ is positive. For example pixels in the RIS image 702 may be constructed from beam sweeps 214 of the scan pattern 201 shown in FIG. 2. In another example, pixels in the RIS image 702 may be constructed from beam sweeps 318 of the scan pattern 301 shown in FIG. 3.

Referring back to FIG. 2, it may be seen that in a vertical ramp scan pattern 201, a left-to-right scan RIS image 702 may include only pixel values determined from spots traversed during odd-numbered horizontal scan lines 212. Similarly, a right-to-left scan RIS image 704 may include only pixel values determined from spots traversed during even-numbered horizontal scan lines 214. If an embodiment uses RIS images having a size equivalent to a complete image, the missing pixel values may be simulated by copying the RIS pixel values into the missing pixel value locations. For example, a left-to-right RIS image 702 may include odd rows populated by actual calculated pixel values, and even rows populated by copies of the actual values from the row above or the row below.

Referring back to FIG. 3, it may be seen that the Lissajous scan pattern 302 includes left-to-right and top-to-bottom scan lines ($V_H>0$, $V_V>0$) 314, right-to-left and top-to-bottom scan lines ($V_H<0$, $V_V>0$) 316, left-to-right and bottom-to-top scan lines ($V_H>0$, $V_V<0$) 318, and right-to-left and bottom-to-top scan lines ($V_H<0$, $V_V<0$) 320. As indicated above, output images may typically be constructed from all four sets of scan lines. In the example above, for instance, $S_0$ was collected during a ($V_H>0$, $V_V>0$) sweep 314 and $S_1$ was collected during a ($V_H>0$, $V_V<0$) sweep 318; and the values of $S_0$ and $S_1$ were combined to calculate the value of the pixel $P_0$.

A RIS image may be constructed from the Lissajous scan pattern 302 by calculating pixels from spots detected during a corresponding subset of the scan lines 314, 316, 318, or 320. For example the RIS pixel $P_0'$ may be calculated as a weighted average of scanned spots $S_0'$ and $S_1'$. Thus the RIS pixel $P_0'$ may be inserted into a RIS image 702 (referred to below as matrix image_h_0) because the spots $S_0'$ and $S_1'$ are spots traversed by the scanned beam while horizontal scan velocity $H_V$ and the vertical scan velocity $V_V$ are both positive. RIS pixel values may similarly be calculated for other RIS images 704 and 706 by using spots from corresponding scan lines 316 and 318 to calculate the respective pixel values.

As with the calculation of pixel values $P_0$ in an output image, described above, the calculation of RIS image pixel values $P_0'$ may optionally be performed using more complex formulas and or more spots than simple linear combinations of two spot values. Furthermore, additional pixels may be calculated from collected spots, or alternatively may be copied from calculated RIS image pixel values $P_0'$. Thus, a RIS image does not necessarily refer to a reduced number of pixels in an image, but rather pixels calculated from a reduced number of spot values.

Referring again to FIG. 6, after obtaining the RIS images (either image 702 and image 704, or image 702 and image 706), the process proceeds to step 604. In step 604, the apparent position of features in one RIS image is compared to the apparent position of features in another RIS image. For example, referring to FIGS. 5, 7A and 7B, image_h_0 702 may include substantially only image portion 502, and image_h_1 704 may include substantially only corresponding image portion 504. The relative positions of image portions 502 and 504 may be compared. The amount of change in position, shift_h (which may be defined to be relative to image_h_0), needed to correct the image portions 502 and 504 such that they are coincident (thus achieving the in-phase image 401 with crisp feature positions 402 of FIG. 1), is one-half the distance in pixels between corresponding features in image portions 502 and 504. That is, image portion 502 needs to be moved half-way toward image portion 504, and image portion 504 needs to be moved half-way toward image portion 502.

The process next proceeds to step 606, during which an amount of horizontal phase correction $P_h$ is determined. If the total horizontal extent of an image in pixels is H, then the change in phase may be determined, with respect to image_h_0, as $P_h$=arcsin (shift_h/H). In this example, shift_h may be positive and correspond to a positive scanner horizontal phase shift (an advance in the scanner phase) because the actual position in the scanner was retarded compared to where the image processor assumed it to be, causing image portion 502 to be rendered to the right of its actual position and causing image portion 504 to be rendered to the left of its actual position.

Proceeding to step 608, the phase drive signal is modified in a manner corresponding to the value $P_h$. The process 601 then loops back to step 602 and process 601 may be repeated.

Figure 8:
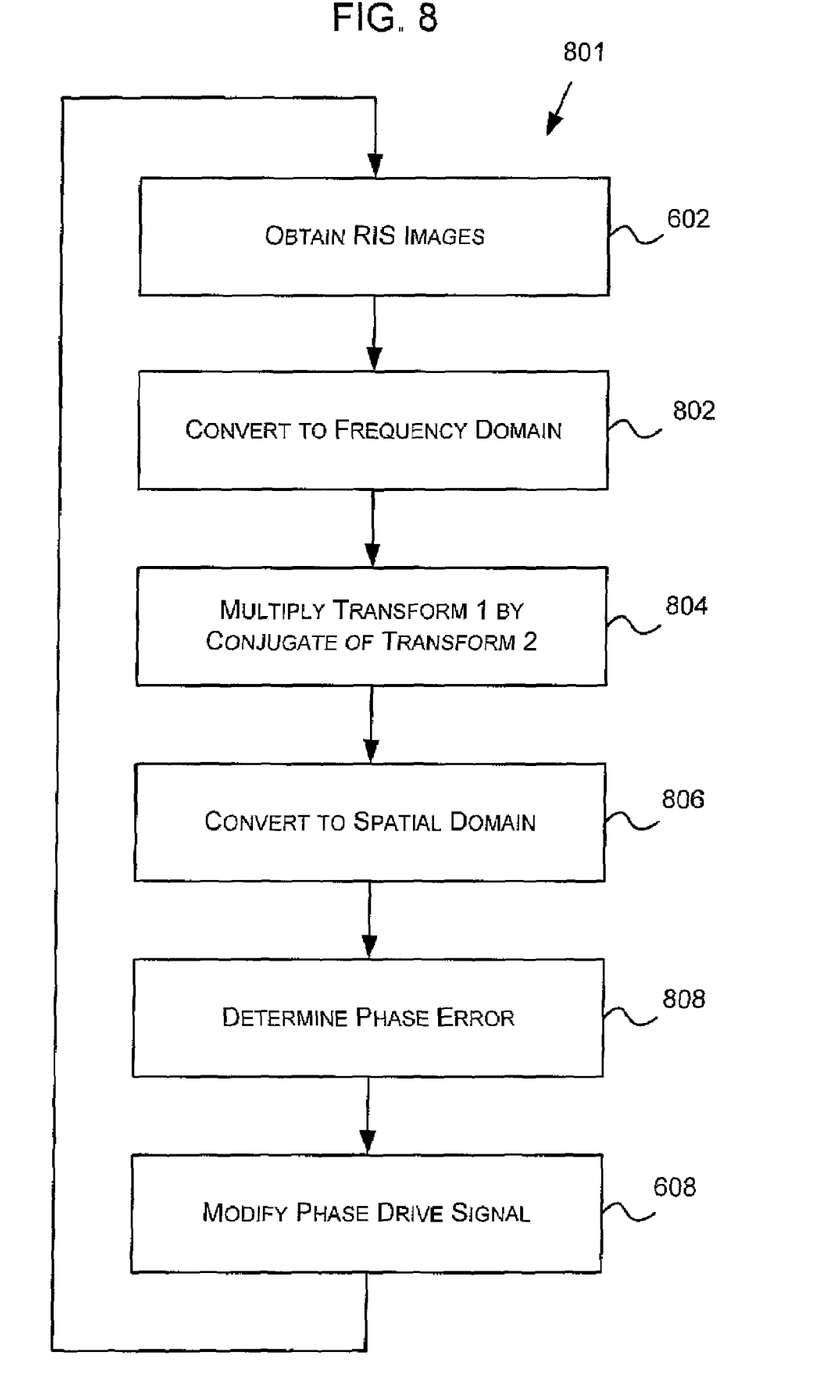
FIG. 8 is a process for determining the phase of a scanned beam from an image, according to another embodiment.

While the process 601 of FIG. 6 was described graphically for ease of understanding, a frequency domain process may be used. The process 801 of FIG. 8 is one example of a frequency domain process for detecting and correcting phase errors in a scanned beam imager. A frequency domain process may have an advantage with respect to computational complexity, computation time, and or phase detector 135 bandwidth requirements over a spatial domain process.

Process 601 begins with step 602 where RIS images are obtained, for example as described above. One reduced information set image may be referred to as the first RIS image and the other reduced information set image may be referred to as the second RIS image. For example, the first RIS image may correspond to image 702 and the second RIS image may correspond to image 704.

Next, the process proceeds to step 802, where the RIS images are transformed into the frequency domain. The frequency domain transformation may be performed, for example, using a two-dimensional FFT to produce respective first and second 2D frequency domain "images" or matrices.

Next, the process proceeds to step 804. First, the second FFT matrix is converted to its conjugate. Then, the first FFT matrix is multiplied by the conjugate of the second FFT image. The result is a single product matrix.

Next, the process proceeds to step 806, where the product matrix is converted to the spatial domain, to form a cross-correlated matrix. This may be done, for example, by taking an inverse FFT of the product matrix. Optionally, filtering may be performed on the product matrix prior to taking the inverse FFT.

Figure 9:
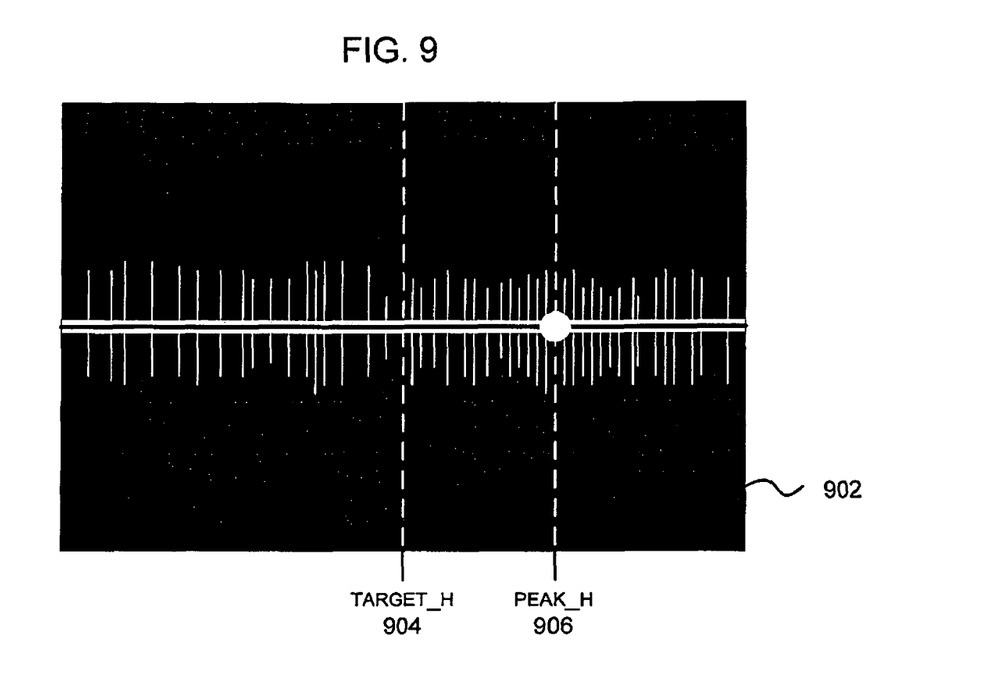
FIG. 9 is a simplified depiction of an intermediate image that may be used in the process of FIGS. 6, 8 and/or 10A-10B to determine a phase error, according to an embodiment.

The process next proceeds to step 808 where the apparent phase error is determined from the image characteristics of the spatial domain cross-correlated image. Referring to FIG. 9, the cross-correlated spatial domain image may include key features represented in the image representation 902. Filtering, such as high pass filtering, may help to produce an image with characteristics akin to image representation 902. A target horizontal position target_h 904 may be located centered along the horizontal axis. A bright point or peak value peak_h 906 may be located at or to the left or right of the target position. The horizontal distance between the bright point 906 and the target position 904 corresponds to the phase error, in pixels, that was present when the RIS images (and any corresponding full image) were rendered. Thus, a bright point 906 that coincides with the target position 904 is indicative of an in-phase condition. A bright point 906 offset to the right of the target position 904 is indicative of a phase error of one sign (positive or negative), and a bright point 906 offset to the left of the target position 904 is indicative of a phase error of the other sign. For example, the bright point 906 in the representative image 902 is offset to the right of the target image. The rightward position may be assigned a positive phase error or phase correction.

In any event, the location of the target position 904 is typically fixed. The position of the bright point 906 may be determined using conventional image processing techniques. The phase error may be determined by dividing the horizontal distance in pixels between the bright point and the target location by the total number of pixels H in the horizontal dimension of the RIS images, and taking the arc sine of the result to determine the phase error in radians.

Referring back to FIG. 8, the process then proceeds to step 608, where the phase drive signal may be modified to correct the detected phase error. The process 801 then loops and another frame is captured, another set of RIS images produced, and the phase error detection and correction is repeated.

Figure 10A:
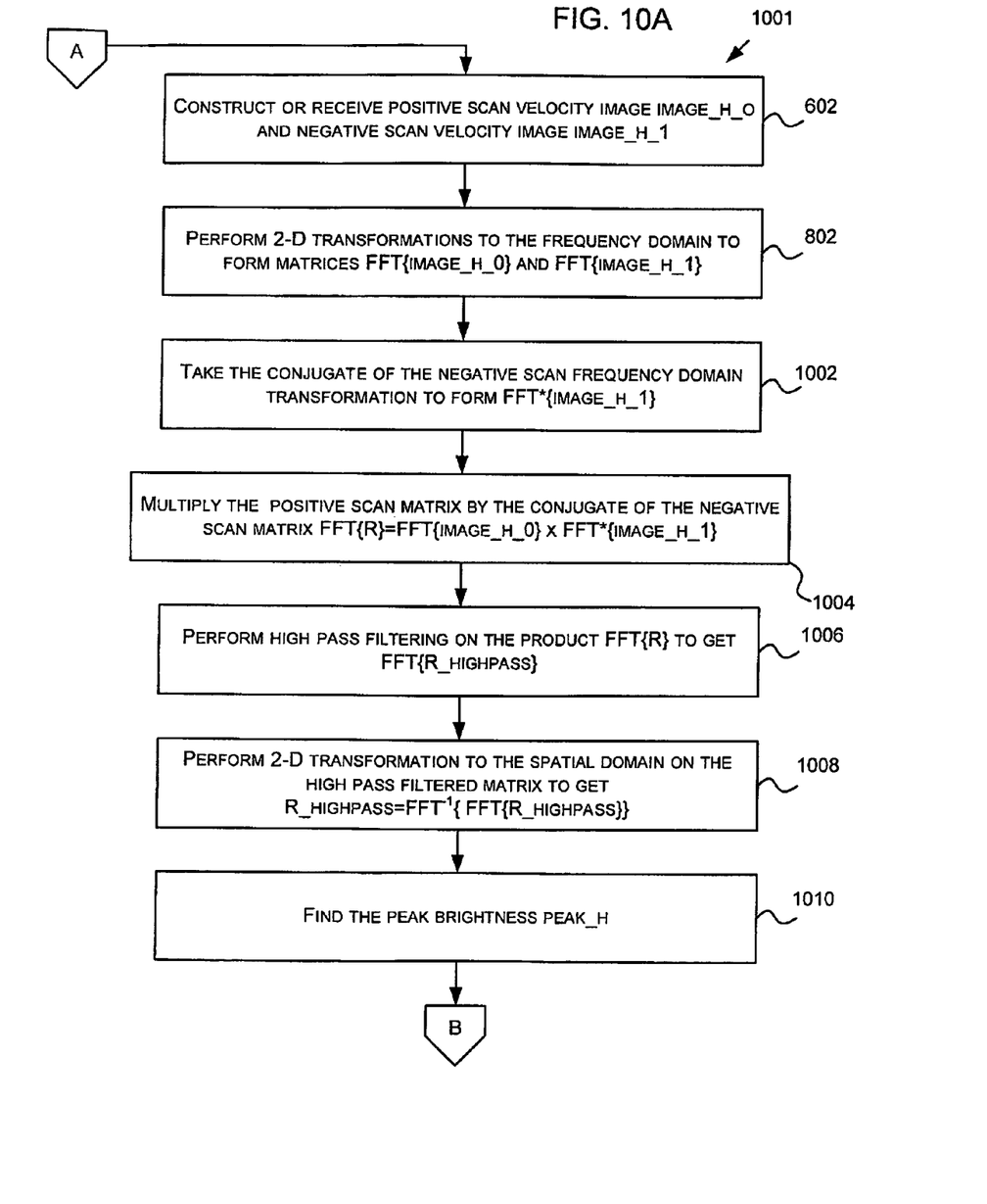
FIGS. 10A and 10B are a process for determining phase error from an image including mathematical detail, according to an embodiment
Figure 10B:
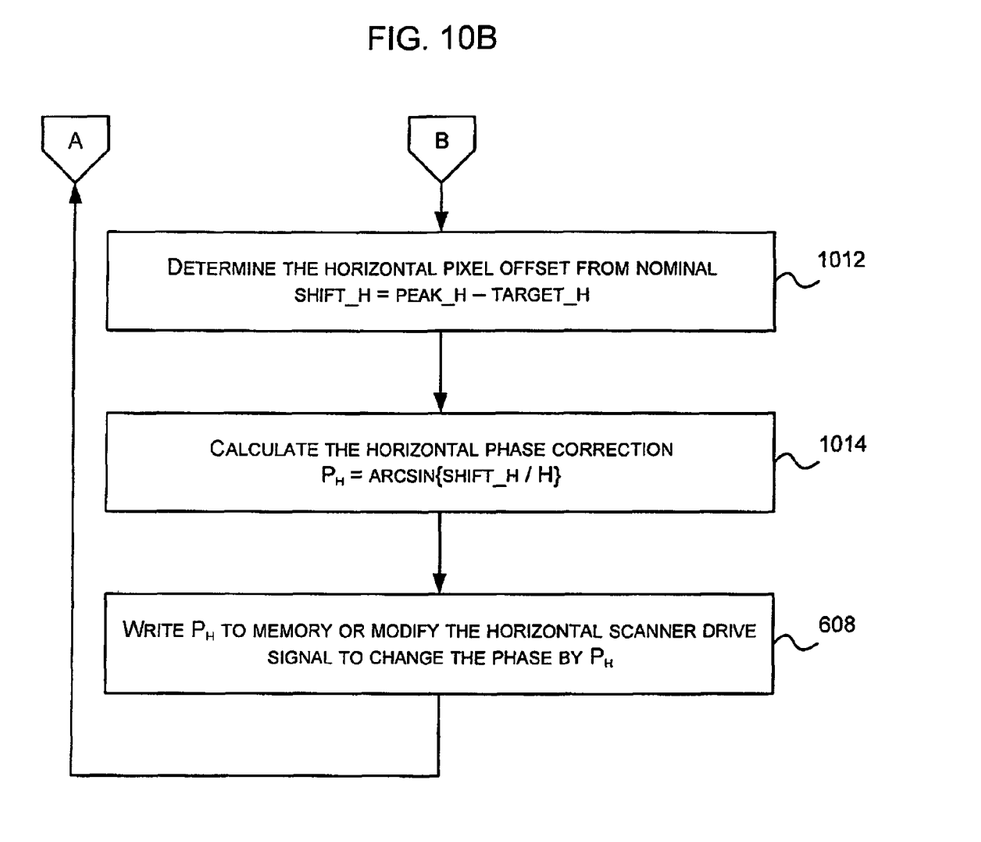

FIGS. 10A and 10B show another flow chart showing a process 1001. The process 1001 provides some additional detail compared to the process of FIG. 8, according to an embodiment. The process 1001 begins by looping from the off-page connector A to step 602. In step 602, a positive scan direction RIS image and a negative scan direction RIS image are produced (first and second RIS images, respectively).

For ease of description, we will again assume that the first RIS image corresponds to image 702 of FIG. 7A. Image 702 may be characterized by pixels captured or calculated during positive horizontal and vertical scans ($V_H$>0, $V_V$>0). Since we will describe an example of horizontal phase correction, image 702 may be assigned the variable name "image_h_0". Similarly, the second RIS image corresponds to image 704 of FIG. 7B. Image 704 may be characterized by pixels captured or calculated during negative horizontal and positive vertical scans ($V_H$<0, $V_V$>0). Image 702 may be assigned the variable name "image_h_1".

Next, the process 1001 proceeds to step 802, where 2D transformations to the frequency domain are performed on the RIS images. According to an embodiment, respective 2D fast Fourier transforms (FFTs) are performed on image_h_0 and image_h_1 to respectively produce FFT{image_h_0} and FFT{image_h_1}. The frequency domain matrices FFT{image_h_0} and FFT{image_h_1} are typically matrices of complex numbers.

The process 1001 then proceeds to step 1002, where the conjugate of FFT{image_h_1} is taken to produce FFT*{image_h_1}.

Proceeding to step 1004, a matrix FFT{R} is obtained by multiplying the frequency domain matrix corresponding to the RIS image derived from positive velocity scans, FFT{image_h_0}, by the conjugate, FFT*{image_h_1}, of the frequency domain matrix corresponding to the RIS image derived from negative velocity scans (FFT{image_h_1}), according to the relationship:

$$FFT\{R\}=FFT\{image\_h\_0\} \times FFT^*\{image\_h\_1\}$$

The process 1001 then proceeds to step 1006, which may be optional in some embodiments. In step 1006, high pass filtering is performed on the matrix FFT{R} to obtain the high pass filtered matrix FFT{R_highpass}. High pass filtering may help to provide a sharper definition of the bright point obtained in step 1010, below.

Proceeding to step 1008, an image, R_highpass, of the phase error is obtained by transforming the filtered matrix FFT{R_highpass} to the spatial domain. The transformation to the spatial domain may be performed, for example, by using an inverse fast Fourier transform, $FFT^{-1}$, according to the relationship:

$$R\_highpass = FFT^{-1}\{FFT\{R\_highpass\}\}$$

The process 1001 then proceeds to step 1010. The matrix R_highpass may be displayed as an image represented by the image 902 of FIG. 9. As may be seen in FIG. 9, the image 902 (for a horizontal phase error detection) typically includes a dark horizontal line superimposed over a somewhat wider light horizontal line, with vertical streaks of light (high value) pixels extending upward and downward from the horizontal lines. The background is typically mottled but relatively dark (low pixel values). At some point along the horizontal axis is a bright point 906, of high value pixels labeled peak_h. The bright point 906 may correspond, for example, to a maximum probability offset of the phase of one RIS image from the RIS images of opposite sign.

In step 1010, image processing is performed to find the horizontal location of peak_h in the image R_highpass. Such image processing may be relatively simple or relatively sophisticated, and may further rely on previous values of the peak_h location. For example, one relatively simple form of image processing may be to proceed from left-to-right near the horizontal line in image 902 and form a running average of the pixel values, such as a 10 pixel average, for example. As long as the moving average continues to increase, the process continues. When the value of the moving average drops, the process stops and the centroid of the range of averaged pixels is noted. Then a moving average of pixel values is calculated from right-to-left and also notes the maximum. If the locations of the left-to-right and right-to-left maxima are substantially coincident, then the horizontal location is noted and set equal to peak_h. If the locations are not coincident, then further iterative searching may be performed to find the most likely horizontal location of the bright point. Alternatively, a segmented least-squares fit may be made to determine the bright point. Other simplified, alternative, or more sophisticated search approaches to find the bright point 906 may be substituted.

Returning to the process 1001, the process then proceeds from step 1010 through off-page reference B to step 1012 in FIG. 10B. FIG. 9 also shows the location of a target 904. The target_h represents the horizontal position where the bright point 906 would be if the scanner phase was without error. The number of pixels of shift necessary to make the bright point 906 and the target 904 coincide may be determined as shift_h, according to the relationship:

$$shift\_h = peak\_h - target\_h,$$

where peak_h and target_h are both horizontal locations in the image 902, counted in pixels. Shift_h is therefore a horizontal distance in pixels between the bright point 906 and the target 904.

Proceeding to step 1014, the number of pixels of location error is converted to a phase error, which in the horizontal axis is designated $P_H$. The phase error may be calculated according to the relationship:

$$P_H = \arcsin\{shift\, h/H\},$$

where H is the size of the image R_highpass in the horizontal dimension. Proceeding to step 608, the value of the horizontal phase shift $P_H$ may be used to modify the scanner drive phase to bring the phase back into synchronization. The process then loops back, through off-page reference A to begin again at step 601 of FIG. 10A.

While embodiments of phase detection and correction processes have been described with respect to horizontal phase, a corresponding process may be applied to vertical phase, when the beam scan path includes upward-sweeping and downward-sweeping scans. For example, the RIS image 702 in FIG. 7A may alternatively be designated image_v_0, because its pixels are derived only from sweeps 314 (FIG. 3) with vertical velocity, $V_V > 0$. The RIS image 706 of FIG. 7C may be designated image_v_1, because its pixels are derived only from sweeps 318 (FIG. 3). The images image_v_0 and image_v_1 may then be used in the process of FIGS. 6, 8, and 10A-10B in a manner corresponding to that previously described for image_h_0 and image_h_1. After transformation to the frequency domain, multiplying the corresponding frequency matrices (FFT{D}=FFT{image_v_0}× FFT*{image_v_1}), and conversion back to the spatial domain, an image showing vertical phase error is produced. The vertical phase error image corresponds to image 902, except the axes may be switched and the vertical distance from a bright point peak_v may be compared to a target location target_v to determine a vertical phase error.

Accordingly, according to embodiments, the apparatus and methods described herein may be used to determine horizontal and/or vertical phase error or synchronization in a scanned beam image capture apparatus from the relative characteristics of reduced information set (RIS) images produced only from pixels derived from scans in opposite directions along the respective axes.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method for detecting scanner phase error in a scanned beam imager, comprising:
    obtaining a first image including pixels derived from a first scan direction;
    obtaining a second reduced information set image consisting of pixels derived from a second scan direction;
    comparing apparent image feature positions in the first and second images; and
    calculating a phase error corresponding to a difference between the apparent image feature positions.

2. The method of claim 1 wherein the first image includes a reduced information set image consisting of pixels derived from the first scan direction.

3. The method of claim 1 wherein the first and second scan directions are substantially opposite one another.

4. The method of claim 1 wherein the first direction is generally left-to-right and the second direction is generally right-to-left.

5. The method of claim 1 wherein the first direction is generally top-to-bottom and the second direction is generally bottom-to-top.

6. The method of claim 1 wherein comparing the apparent image feature positions further comprises cross-correlating the first and second images.

7. The method of claim 1 wherein comparing the apparent image feature positions further comprises:
    transforming the first and second images to the frequency domain;

calculating a product matrix from the transformed first and second images;
transforming the product matrix to form an intermediate image in the spatial domain; and
comparing the position of a bright point to a target position in the intermediate image.

8. The method of claim 1 wherein comparing the apparent image feature positions further comprises:
calculating a fast Fourier transform of the first image to derive a first transform;
calculating a fast Fourier transform of the second image to derive a second transform;
calculating the conjugate of the second transform;
multiplying the transform of the first image by the conjugate of the second image to derive a product matrix;
calculating an inverse fast Fourier transform on the product matrix to derive an intermediate image;
finding the location of a peak brightness along an axis in the intermediate image;
determining a pixel offset from nominal along the axis by subtracting a target location from the peak brightness location.

9. The method of claim 8, wherein comparing the apparent image feature positions further comprises:
performing high pass filtering on the product matrix; and wherein
calculating an inverse fast Fourier transform on the product matrix includes calculating an inverse fast Fourier transform on the filtered product matrix to derive the intermediate image.

10. The method of claim 1 wherein comparing the apparent image feature positions further comprises:
calculating a fast Fourier transform of the first image, image_0, to derive a first transform, FFT{image_0};
calculating a fast Fourier transform of the second image, image_1, to derive a second transform, FFT{image_1};
calculating the conjugate of the second transform, FFT{image_1}, to derive FFT*{image_1};
multiplying the transform of the first image, FFT{image_0}, by the conjugate of the transform of the second image, FFT*{image_1}, to derive a product matrix FFT{R};
calculating an inverse fast Fourier transform on the product matrix, FFT{R}, to derive an intermediate image, FFT$^{-1}${FFT{R}};
finding the location of a peak brightness along an axis, peak, in the intermediate image, FFT$^{-1}${FFT{R}};
determining a pixel offset from nominal along the axis, shift, by subtracting a target location, target, from the peak brightness location, peak; and
calculating a phase error, P, along the axis as the arc sine of the pixel offset, shift, divided by the number of pixels along the axis, N, P=arcsin{shift/N}.

11. The method of claim 10, further comprising driving a signal to minimize the phase error.

12. The method of claim 1, further comprising:
driving a signal to correct the calculated phase error.

13. The method of claim 1, further comprising:
modifying the phase of a scanner drive signal to minimize the calculated phase error.

14. The method of claim 1, further comprising:
providing an electronic controller for the scanned beam imager;
and wherein obtaining the first and second images, comparing the apparent image feature positions, and calculating the phase error are performed by the electronic controller.

15. The method of claim 1, wherein obtaining the first and second images, comparing the apparent image feature positions, and calculating the phase error are performed by a computer separate from the scanned beam imager.

16. The method of claim 1 wherein comparing the apparent image feature positions further comprises:
calculating a fast Fourier transform of the first image, image_0, to derive a first transform, FFT{image_0};
calculating a fast Fourier transform of the second image, image_1, to derive a second transform, FFT{image_1};
calculating the conjugate of the second transform, FFT{image_1}, to derive FFT*{image_1};
multiplying the transform of the first image, FFT{image_0}, by the conjugate of the transform of the second image, FFT*{image_1}, to derive a product matrix FFT{R};
performing high pass filtering on the product matrix, FFT{R}, to derive a filtered product matrix, FFT{R_highpass};
calculating an inverse fast Fourier transform on the filtered product matrix, FFT{R_highpass}, to derive a cross correlation, FFT$^{-1}${FFT{R_highpass}};
finding the location of a peak brightness along an axis, peak, in the cross correlation, FFT$^{-1}${FFT{R_highpass}};
determining a pixel offset from nominal along the axis, shift, by subtracting a target location, target, from the peak brightness location, peak; and
calculating a phase error, P, along the axis as the arc sine of the pixel offset, shift, divided by the number of pixels along the axis, N, P=arcsin{shift/N}.

17. A scanned beam image capture system, comprising:
a scanner configured to bidirectionally scan a beam of light across a field of view at a first phase;
a detector configured to receive light scattered from the scanned beam of light and output a corresponding detection signal;
an image processor operatively coupled to receive the detection signal at a second phase and configured to derive first and second reduced information set images from the detection signal; and
a phase detector operable to receive the first and second reduced information set images, compare the two images, and determine a parameter corresponding to an error between the first phase and the second phase.

18. The scanned beam image capture system of claim 17, further comprising:
a phase driver operable to receive the parameter and drive the first phase to minimize the value of the parameter.

19. The scanned beam image capture system of claim 18, wherein the phase driver includes a scanner drive circuit.

20. The scanned beam image capture system of claim 17, further comprising:
a phase driver operable to receive the parameter and drive the second phase to minimize the value of the parameter.

21. The scanned beam image capture system of claim 20 wherein driving the second phase includes writing a phase correction parameter to memory.

22. The scanned beam image capture system of claim 17, wherein the scanner is configured to scan the beam of light across a field of view in a two dimensional pattern, wherein at least one of the dimensions is driven bidirectionally at the first phase.

23. The scanned beam image capture system of claim 17, wherein the first reduced information set image is derived from scans made in one of the directions and the second reduced information set image is derived from scans made in the other of the directions.

24. The scanned beam image capture system of claim 17, wherein the phase detector is operable to compare the two images using steps including:
   transforming the first and second reduced information set images into corresponding frequency domain matrices;
   calculating the conjugate of second frequency domain matrix;
   multiplying the first frequency domain matrix by the conjugate of the second frequency domain matrix to form a product matrix;
   filtering the product matrix;
   transforming the filtered product matrix to the spatial domain to form an intermediate image; and
   comparing the location of a bright spot to a target location in the intermediate image.

25. A method, comprising:
   obtaining a first reduced information set image, image_h_0, consisting of pixels derived from left-to-right scanning of two-dimensional field of view by a scanned beam image capture device;
   obtaining a second reduced information set image, image_h_1, consisting of pixels derived from right-to-left scanning of the two-dimensional field of view by the scanned beam image capture device;
   calculating a fast Fourier transform of the first image, image_h_0, to derive a first transform, FFT{image_h_0};
   calculating a fast Fourier transform of the second image, image_h_1, to derive a second transform, FFT{image_h_1};
   calculating the conjugate of the second transform, FFT{image_h_1}, to derive FFT*{image_h_1};
   multiplying the transform of the first image, FFT{image_h_0}, by the conjugate of the transform of the second image, FFT*{image_h_1}, to derive a product matrix FFT{R};
   performing high pass filtering on the product matrix, FFT{R}, to derive a filtered product matrix, FFT{R_highpass};
   calculating an inverse fast Fourier transform on the filtered product matrix, FFT{R_highpass}, to derive an intermediate image, $FFT^{-1}${FFT{R_highpass}};
   finding the location of a peak brightness, peak_h, along the horizontal axis, of the intermediate image, $FFT^{-1}${FFT{R_highpass}};
   determining a pixel offset from nominal along the horizontal axis, shift_h, by subtracting a target horizontal location, target_h, from the peak brightness location, peak_h;
   calculating a phase error, $P_H$, along the horizontal axis as the arc sine of the pixel offset, shift_h, divided by the number of pixels along the axis, H, as $P_H$=arcsin{shift_h/H}.

26. The method of claim 25, further comprising:
   modifying the phase of a horizontal drive signal to a scanner in the scanned beam image capture by the amount $P_H$.

* * * * *